Jan. 8, 1924.

W. A. BJORNSTAD ET AL.

1,479,951

ELECTRIC OVEN FOR DENTAL PURPOSES

Filed Sept. 15, 1922

INVENTORS:
Willard A. Bjornstad
Rudolph A. Silene
BY Whiteley and Ruckman
ATTORNEYS Patented Jan. 8, 1924.

1,479,951

UNITED STATES PATENT OFFICE.

WILLARD A. BJORNSTAD AND RUDOLPH A. SILENE, OF MINNEAPOLIS, MINNESOTA.

ELECTRIC OVEN FOR DENTAL PURPOSES.

Application filed September 15, 1922. Serial No. 588,355.

*To all whom it may concern:*

Be it known that we, WILLARD A. BJORNSTAD and RUDOLPH A. SILENE, citizens of the United States, residing at Minneapolis, in the county of Hennepin and State of Minnesota, have invented certain new and useful Improvements in Electric Ovens for Dental Purposes, of which the following is a specification.

Our invention relates to electric ovens for dental purposes, and an object is to provide a device for burning out or melting wax models. In making dental castings or inlays, it is common practice to make a wax model or pattern having the shape of the tooth cavity which is to be filled. This model after being removed from the tooth cavity is imbedded in investment material such as plaster-of-Paris and the wax is afterward burned out or melted, thereby leaving a cavity in the investment material into which gold or other filling material is poured to form the inlay which is to be placed in the tooth cavity. A particular object of the present invention is to provide means for imparting the proper degree of heat to melt the wax and allow it to be completely absorbed by the investment material.

The full object and advantages of our invention will appear in connection with the detailed description, and the novel features of our inventive idea will be particularly pointed out in the claims.

Figure 1:
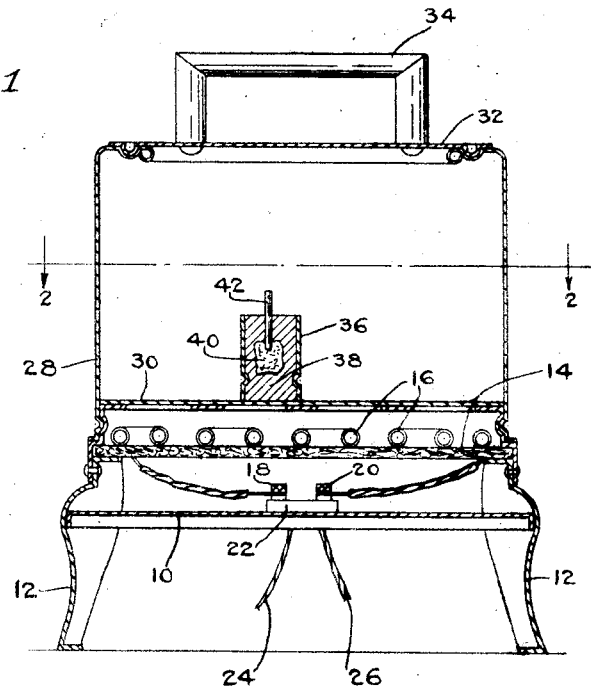
Figure 2:
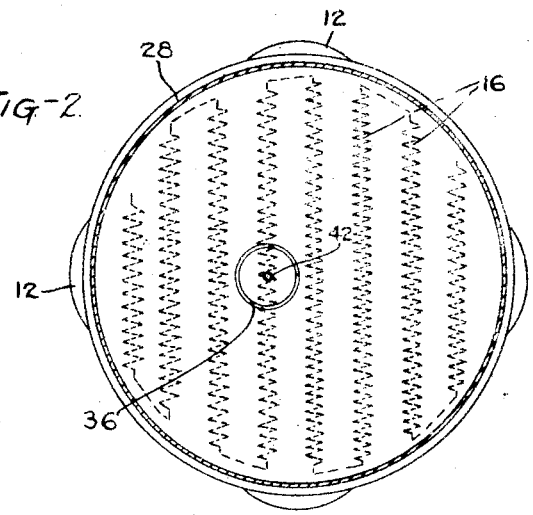

In the accompanying drawings, Fig. 1 is a view of the oven in vertical section. Fig. 2 is a view in horizontal section on the line 2—2 of Fig. 1.

As illustrated, we provide a base which consists of a horizontal member 10 and supporting legs 12 connected thereby. The legs 12 extend above the member 10 which is of sheet material and this construction provides a base which is entirely open at its upper end. A disk or plate of insulating material 14 is supported at the upper end of the base. Heating coils 16 are placed on top of the plate 14 and the ultimate ends of these coils are connected to binding posts 18 and 20 carried by a block 22 of insulating material mounted on the base member 10. Connected to these binding posts are wires 24 and 26 by means of which electricity is supplied from any convenient source for heating the coils. Secured to the upper ends of the legs 12 is a casing 28 which is preferably cylindrical in form. The disk 14 constitutes an air-tight closure for the bottom of the casing. Supported in the lower portion of the casing and directly above the coils 16 is a metal plate 30 which when the coils are heated acts as a hot plate to radiate heat. The upper end of the casing is provided with a cover 32 having a handle 34.

The operation and advantages of our invention will now be obvious. One or more molding flasks 36 are placed directly upon the plate 30. Each of these flasks contains the investment material 38 surrounding the wax model 40 which has a sprue rod 42 extending up through the investment material. A considerable number of flasks of different sizes if such are used may be placed upon the plate 30 and upon turning on the current this plate quickly becomes heated and acts as a hot plate to supply sufficient heat to the wax models so that they are melted and absorbed by the investment material, thereby leaving a mold in each flask in which the dental casting or inlay may be formed.

We claim:

1. An electric oven for dental purposes comprising a base which is open at its upper end, a casing having a continuous vertical wall attached to said upper end, a disk of insulating material supported at said upper end to constitute an airtight closure for the bottom of said casing, heating coils positioned upon the upper surface of said disk, means whereby electric current may be supplied to said coils, and a metal plate positioned in the lower portion of said casing close to the upper surface of said coils to constitute a hot plate for supporting flasks containing investment material and embedded wax models.

2. An electric oven for dental purposes comprising supporting legs, a horizontal sheetlike member connecting said legs intermediate their upper and lower ends, a casing having a continuous vertical wall attached to the upper ends of said legs, a disk of insulating material supported at the upper ends of said legs to constitute an airtight closure for the bottom of said casing, heating coils positioned upon the upper surface of said disk, two binding posts insulatively mounted upon said horizontal member, the ultimate ends of said coils being connected to said posts, and a metal plate positioned in the lower portion of said casing close to the upper surface of said coils to constitute a hot plate for supporting flasks containing investment material and embedded wax models.

In testimony whereof we hereunto affix our signatures.

WILLARD A. BJORNSTAD.
RUDOLPH A. SILENE.